(12) United States Patent
Horsham

(10) Patent No.: US 6,848,726 B1
(45) Date of Patent: Feb. 1, 2005

(54) TRACTION ENHANCING SYSTEM

(76) Inventor: Carl Horsham, 4949 Manitoba Dr. #609, Alexandria, VA (US) 22312

( * ) Notice: Subject to any disclaimer, the term of this patent is extended or adjusted under 35 U.S.C. 154(b) by 0 days.

(21) Appl. No.: 10/741,545

(22) Filed: Dec. 19, 2003

(51) Int. Cl.⁷ .............................................. B60B 39/00
(52) U.S. Cl. ...................................... 291/3; 237/12.3 B
(58) Field of Search ........................ 29/3, 1, 23; 165/41; 237/12.3 R, 12.3 B; 280/757, 758; 126/19.5; 291/2, 3, 13

(56) References Cited

U.S. PATENT DOCUMENTS

| | | | | |
|---|---|---|---|---|
| 1,447,004 A | * | 2/1923 | Anthon ........................ 180/309 |
| 2,388,114 A | * | 10/1945 | Boyce .......................... 180/313 |
| 4,063,606 A | * | 12/1977 | Makinson ..................... 180/271 |
| 4,203,423 A | * | 5/1980 | Ricci .......................... 126/271.1 |
| 4,834,320 A | * | 5/1989 | Tyson ..................... 244/103 R |
| 4,848,510 A | * | 7/1989 | Ahmed ......................... 180/309 |
| 5,100,175 A | * | 3/1992 | Swallow et al. ............. 280/757 |
| 5,301,996 A | | 4/1994 | Theis |
| 5,730,402 A | * | 3/1998 | Sallen ......................... 248/74.1 |
| 6,021,843 A | | 2/2000 | Roach |
| 6,270,118 B1 | * | 8/2001 | Ichikawa ..................... 280/757 |
| 6,318,077 B1 | * | 11/2001 | Claypole et al. .............. 60/303 |
| 6,616,059 B2 | * | 9/2003 | Sabhapathy et al. ... 237/12.3 B |
| 6,732,940 B2 | * | 5/2004 | Enander et al. ............. 237/2 A |

* cited by examiner

Primary Examiner—Frantz F. Jules

(57) ABSTRACT

A the traction enhancing system for melting snow and ice around the tires of a vehicle to increase the traction between the wheels and the road. The the traction enhancing system includes a fluid control assembly being designed for being in fluid communication with an internal environmental system of the vehicle for selectively diverting heated fluid provided to the cabin compartment of the vehicle. A plurality of distribution assemblies are operationally coupled to the fluid control assembly whereby the distribution assemblies are in fluid communication with the fluid control assembly. Each of the distribution assemblies is positioned proximate one of a plurality of wheels of the vehicle whereby the distribution assemblies direct the heated fluid onto the snow and ice proximate the wheels to melt the snow and ice and improve traction between the wheels and the road.

9 Claims, 3 Drawing Sheets

TRACTION ENHANCING SYSTEM

BACKGROUND OF THE INVENTION

1. Field of the Invention

The present invention relates to snow melting devices and more particularly pertains to a new the traction enhancing system for melting snow and ice around the tires of a vehicle to increase the traction between the wheels and the road.

2. Description of the Prior Art

The use of snow melting devices is known in the prior art. U.S. Pat. No. 6,021,843 describes a system for melting snow from the wheel wells of a vehicle. Another type of snow melting device is U.S. Pat. No. 4,203,423 having a device for directing exhaust gases from the engine to the tires of the vehicle to melt snow and ice from the tires of a vehicle. U.S. Pat. No. 5,301,996 has an apparatus for directing an air flow ahead of a tire to reduce the air pressure ahead of the tire and improve traction characteristics of the tire.

While these devices fulfill their respective, particular objectives and requirements, the need remains for a system that has certain improved features to melt snow and ice from in front of and behind the wheels of the vehicle.

SUMMARY OF THE INVENTION

The present invention meets the needs presented above by providing exhaust members that are positioned in front of and behind the wheels to direct the heated air onto the snow and ice to melt the snow and from in front of the wheels of the vehicle as well as behind the wheels of the vehicle.

Still yet another object of the present invention is to provide a new the traction enhancing system that provide distribution members that are coupled to the vehicle between the wheels of the vehicle to further melt the snow and ice on the road that is positioned between the wheels of the vehicle.

To this end, the present invention generally comprises a fluid control assembly being designed for being coupled to the vehicle. The fluid control assembly is designed for being in fluid communication with an internal environmental system of the vehicle whereby the fluid control assembly is for selectively diverting heated fluid provided to the cabin compartment of the vehicle. A plurality of distribution assemblies are operationally coupled to the fluid control assembly whereby the distribution assemblies are in fluid communication with the fluid control assembly. Each of the distribution assemblies is designed for being coupled to the vehicle whereby each of the distribution assemblies is positioned proximate one of a plurality of wheels of the vehicle whereby each of the distribution assemblies is for directing the heated fluid onto the snow and ice proximate the associated one of the wheels to melt the snow and ice and improve traction between the wheels and the road when the fluid control assembly is diverting heated fluid to the distribution assemblies.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
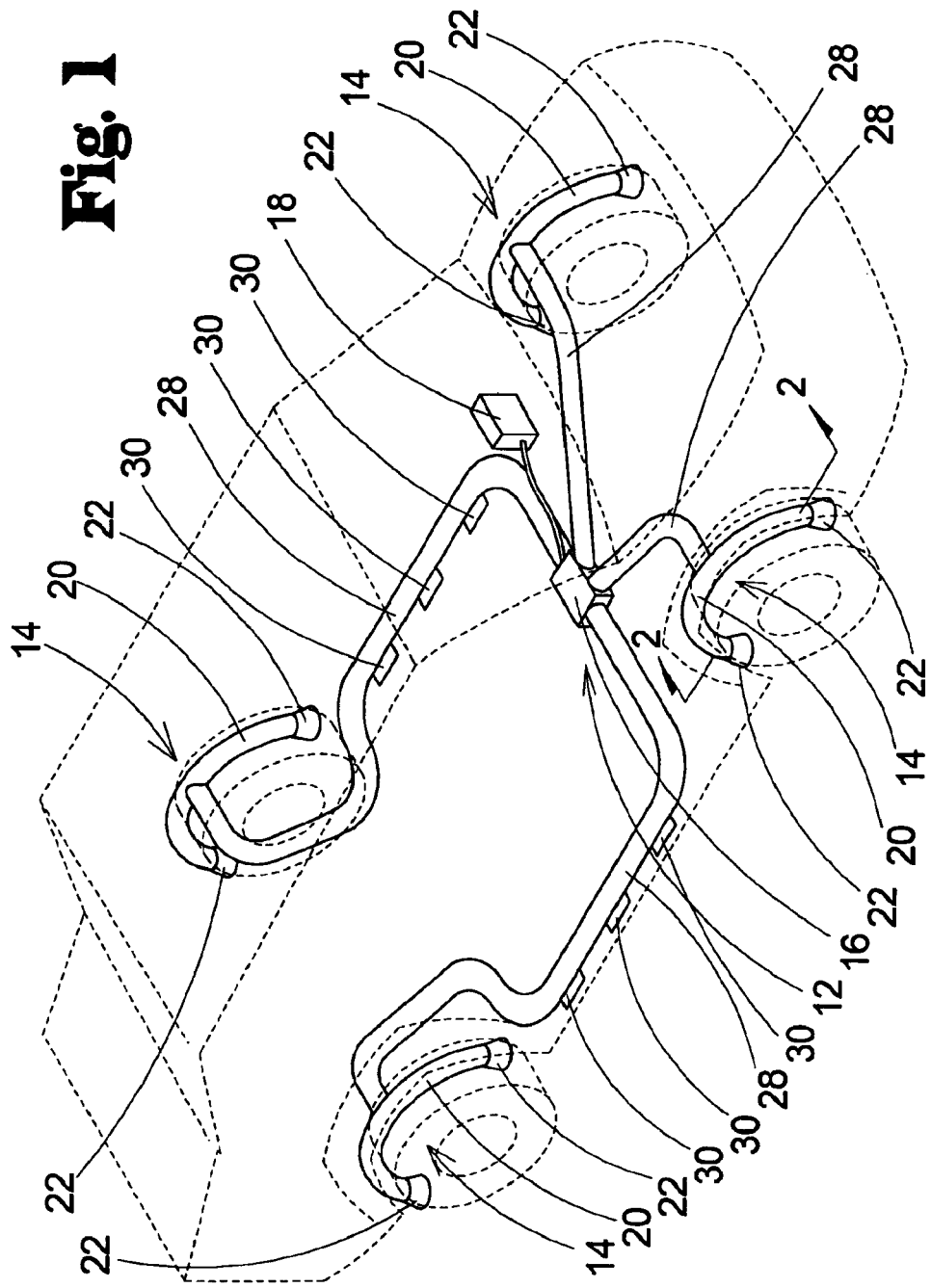
FIG. 1 is a perspective view of a new the traction enhancing system according to the present invention.
Figure 2:
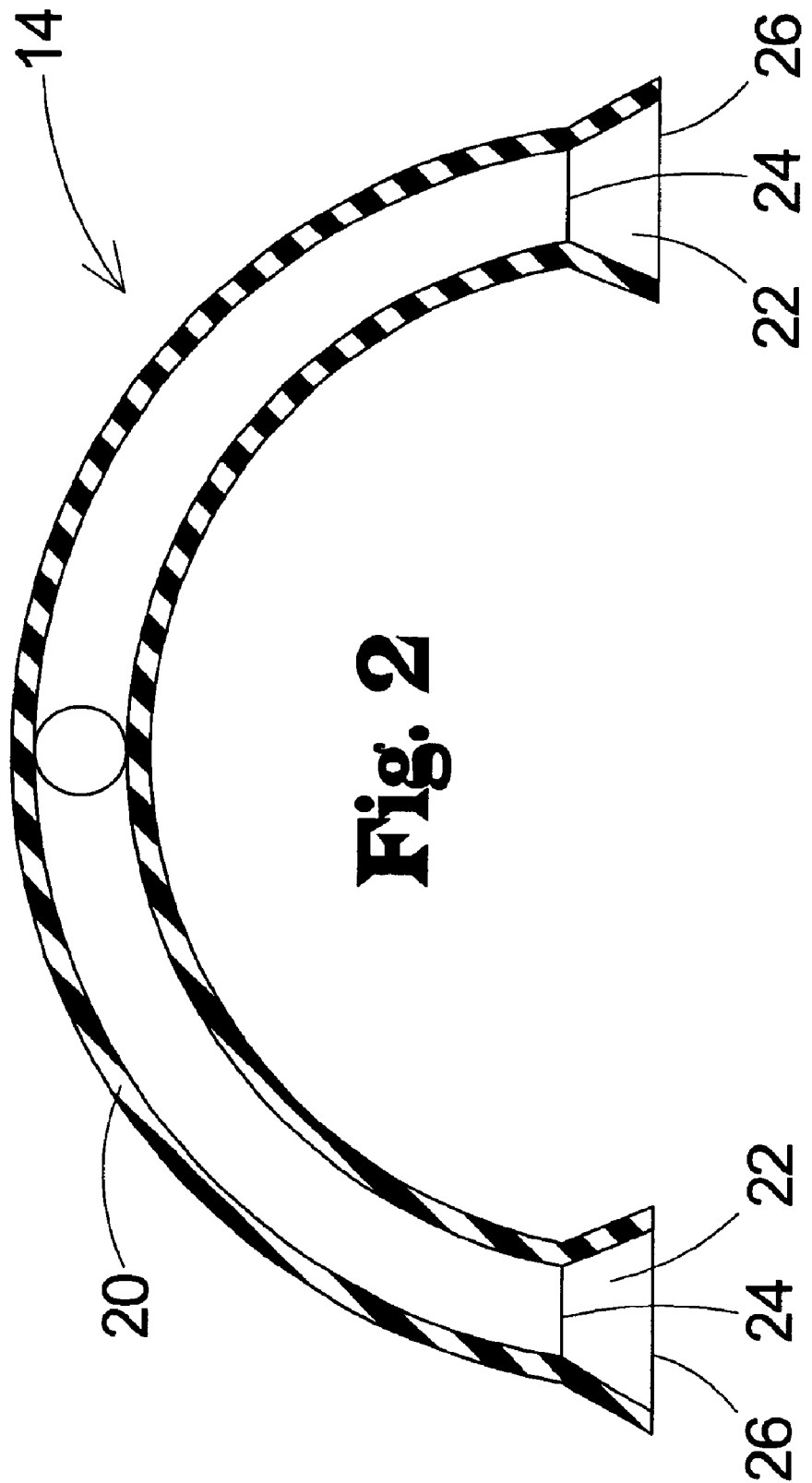
FIG. 2 is a cross-sectional view of the present invention taken along line 2—2 of FIG. 1.
Figure 3:
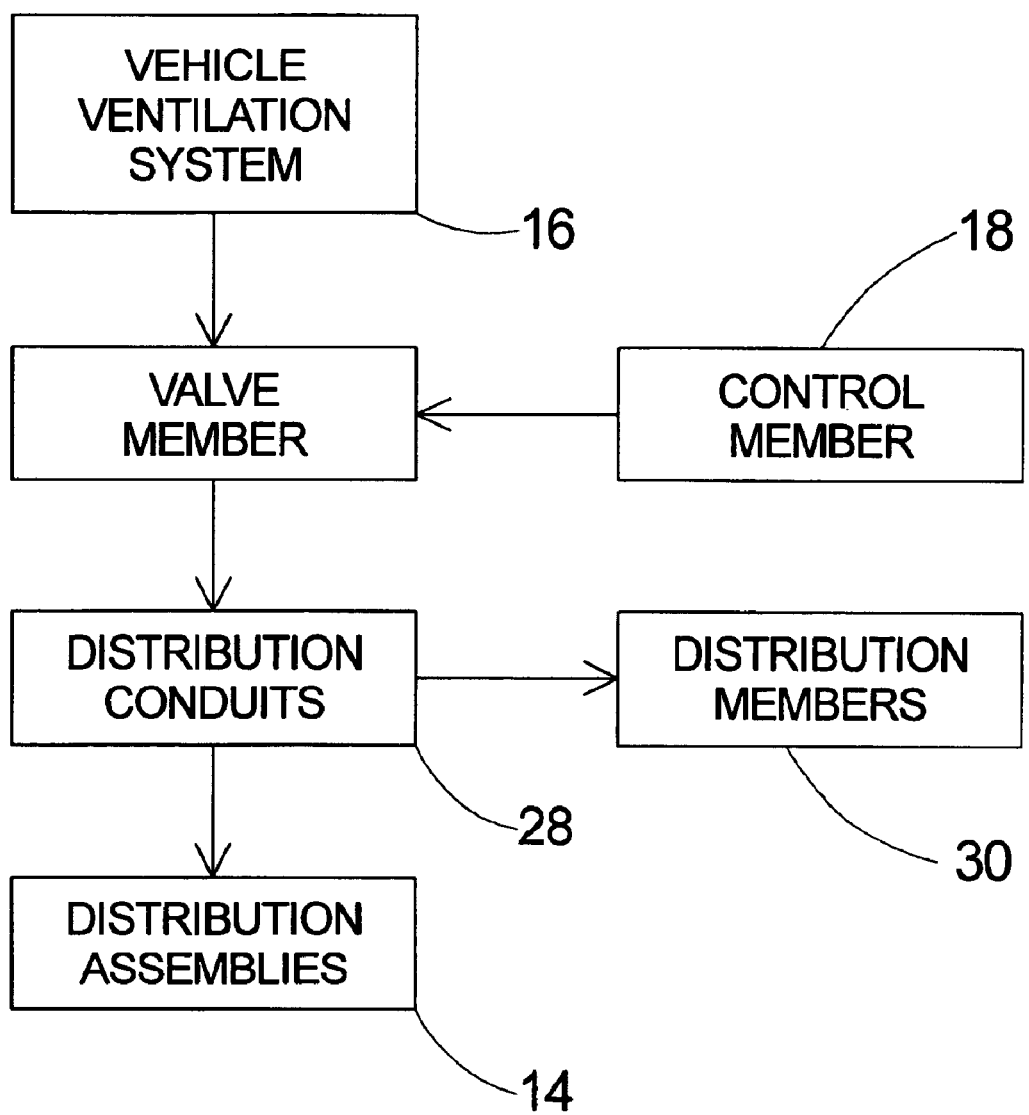
FIG. 3 is a schematic view of the present invention.

With reference now to the drawings, and in particular to FIGS. 1 through 3 thereof, a new the traction enhancing system embodying the principles and concepts of the present invention and generally designated by the reference numeral 10 will be described.

As best illustrated in FIGS. 1 through 3, the the traction enhancing system 10 generally comprises a fluid control assembly 12 being designed for being coupled to the vehicle. The fluid control assembly 12 is designed for being in fluid communication with an internal environmental system of the vehicle whereby the fluid control assembly 12 is for selectively diverting heated fluid provided to the cabin compartment of the vehicle.

A plurality of distribution assemblies 14 are operationally coupled to the fluid control assembly 12 whereby the distribution assemblies 14 are in fluid communication with the fluid control assembly 12. Each of the distribution assemblies 14 is designed for being coupled to the vehicle whereby each of the distribution assemblies 14 is positioned proximate one of a plurality of wheels of the vehicle whereby each of the distribution assemblies 14 is for directing the heated fluid onto the snow and ice proximate the associated one of the wheels to melt the snow and ice and improve traction between the wheels and the road when the fluid control assembly 12 is diverting heated fluid to the distribution assemblies 14.

The fluid control assembly 12 comprises a valve member 16. The valve member 16 is operationally coupled to the distribution assemblies 14. The valve member 16 is designed for being coupled to a ventilation system of the vehicle whereby the valve member 16 is for diverting at least a portion of heated air from the ventilation system of the vehicle to the distribution assemblies 14.

The fluid control assembly 12 comprises a control member 18. The control member 18 is designed for being coupled to a dashboard of a vehicle whereby the control member 18 is easily actuated by a driver of the vehicle. The control assembly is operationally coupled to the valve member 16 of the fluid control assembly 12 whereby the control assembly actuates the valve member 16 to control the amount of heated air diverted from the ventilation system of the vehicle when the control member 18 is actuated by the user.

Each of the distribution assemblies 14 comprises a base conduit 20. The base conduit 20 is operationally coupled to the valve member 16 of the fluid control assembly 12 whereby the base conduit 20 of each of the distribution assemblies 14 is for directing the heated air from the fluid control assembly 12 onto the snow and ice. The base conduit 20 of each of the distribution assemblies 14 is designed for being positioned in one of the wheel wells of the vehicle proximate the associated one of the wheels of the vehicle whereby the base conduit 20 is for directing the heated air in front of and behind the associated one of the wheels.

The base conduit 20 of each of the distribution assemblies 14 comprises a heat resistant flexible material. The heat resistant flexible material is designed for conforming to the associated one of the wheel wells. The heat resistant flexible material is designed for being resistant to heat from the heated air to inhibit the heated air from damaging the base conduit 20.

Each of the distribution assemblies 14 comprises a plurality of exhaust members 22. Each of the exhaust members 22 is coupled to opposite ends of the base conduit 20 of the associated one of the distribution assemblies 14 whereby each of the exhaust members 22 is in fluid communication with the base conduit 20 of the associated one of the distribution assemblies 14. Each of the exhaust members 22 is designed for directing the heated air from the base conduit 20 to an area around the associated one of the wheels of the vehicle to melt the snow and ice.

Each of the exhaust members 22 is substantially funnel shaped whereby a diameter of a first end 24 is smaller than a diameter of a second end 26 of the associated one of the exhaust members 22. The first end 24 of each of the exhaust members 22 is coupled to the base conduit 20 of the associated one of the distribution assemblies 14 whereby the second end 26 of the exhaust members 22 is designed for permitting the heated air to expand to cover a greater area to melt a greater amount of the snow and ice.

A plurality of distribution conduits 28 are operationally coupled between the valve member 16 of the valve control assembly and the base conduit 20s of each of the distribution assemblies 14. Each of the distribution conduits 28 is designed for being coupled to the vehicle. Each of the distribution assemblies 14 permits fluid communication between the valve control assembly and the associated one of the distribution assemblies 14 whereby the distribution conduits 28 are designed for permitting the heated air to be transferred from the valve control assembly to the distribution assemblies 14.

Each of the distribution conduits 28 comprises a heat resistant flexible material. The heat resistant flexible material is designed for conforming to a portion of the vehicle that each of the distribution conduits 28 is coupled to. The heat resistant flexible material is designed for being resistant to heat from the heated air to inhibit the heated air from damaging the distribution conduits 28.

A plurality of distribution are operationally coupled to the distribution conduits 28. Each of the distribution members 30 is in fluid communication with the associated one of the distribution conduits 28. Each of the distribution members 30 is designed for being coupled to the vehicle whereby the distribution members 30 are positioned between the wheels of the vehicle. Each of the distribution members 30 is designed for directing the heated air onto the snow and ice to facilitate melting of the snow and ice to enhance traction of wheels.

In use, the driver actuates the control member 18 to actuate the valve member 16 to redirect all or part of the heated air from the ventilation system of the vehicle into the distribution conduits 28. The distribution conduits 28 direct the heated air to the base conduit 20 of each of the distribution assemblies 14. The base conduit 20 of each of the distribution assemblies 14 directs the heated air to the exhaust members 22 of the associated one of the distribution assemblies 14. The heated air from the exhaust members 22 is directed onto the snow and ice in front of and behind the associated one of the wheels. The distribution members 30 are coupled to the vehicle and are positioned along the body of the vehicle between wheels so that the distribution members 30 can dispense the heated air onto the snow and ice between the wheels and further facilitate melting the snow and ice.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A traction enhancing system for enhancing the traction of a vehicle traveling in snowy and icy conditions, the traction enhancing system comprising:

a fluid control assembly being adapted for being coupled to the vehicle, said fluid control assembly being adapted for being in fluid communication with an internal environmental system of the vehicle suck that said fluid control assembly is for selectively diverting heated fluid provided to the cabin compartment of the vehicle;

a plurality of distribution assemblies being operationally coupled to said fluid control assembly such that said distribution assemblies are in fluid communication with said fluid control assembly, each of said distribution assemblies being adapted for being coupled to the vehicle such that each of said distribution assemblies is positioned proximate one of a plurality of wheels of the vehicle such that each of said distribution assemblies is for directing the heated fluid onto the snow and ice proximate the associated one of the wheels to melt the snow and ice and improve traction between the wheels and the road when said fluid control assembly is diverting heated fluid to said distribution assemblies;

a plurality of distribution conduits being operationally coupled between said valve control assembly and said distribution assemblies, each of said distribution conduits being adapted for being coupled to the vehicle, each of said distribution assemblies permitting fluid communication between said valve control assembly and the associated one of said distribution assemblies such that said distribution conduits are adapted for permitting the heated fluid to be transferred from said valve control assembly to said distribution assemblies; and a plurality of distribution members being operationally coupled to said distribution conduits, each of said distribution members being in fluid communication with the associated one of said distribution conduits, each of said distribution members being adapted for being coupled to the vehicle such that said distribution members are positioned between the front wheels and the rear wheels of the vehicle, each of said distribution members being adapted for directing the heated fluid onto the snow and ice to facilitate melting of the snow and ice between the front wheels and rear wheels of the vehicle to enhance traction of wheels.

2. The traction enhancing system as set forth in claim 1, further comprising:

said fluid control assembly comprising a valve member, said valve member being operationally coupled to said distribution assemblies, said valve member being adapted for being coupled to a ventilation system of the vehicle such that said valve member is for diverting at least a portion of boated air from the ventilation system of the vehicle to said distribution assemblies.

3. The traction enhancing system as set forth in claim 2, further comprising:

said fluid control assembly comprising a control member, said control member being adapted for being coupled to a dashboard of the vehicle such that said control member is easily actuated by a driver of the vehicle, said control assembly is operationally coupled to said valve member of said fluid control assembly such that said control assembly actuates said valve member to control the amount of heated air diverted from the ventilation system of the vehicle when said control member is actuated by the user.

4. The traction enhancing system as set forth in claim 1, further comprising:

each of said distribution assemblies comprising a base conduit, said base conduit being operationally coupled to said fluid control assembly such that said base conduit of each of said distribution assemblies is for directing the heated fluid from said fluid control assembly onto the snow and ice, said base conduit of each of said distribution assemblies being adapted for being positioned in one of the wheel wells of the vehicle proximate the associated one of the wheels of the vehicle such that said base conduit is for directing the heated fluid in front of and behind the associated one of the wheels.

5. The traction enhancing system as set forth in claim 4, further comprising:

said base conduit of each of said distribution assemblies comprising a heat resistant flexible material, said heat resistant flexible material being adapted for conforming to the associated one of the wheel wells, said heat resistant flexible material being adapted for being resistant to heat from the heated fluid to inhibit the heated fluid from damaging said base conduit.

6. The traction enhancing system as set forth in claim 4, further comprising:

each of said distribution assemblies comprising a plurality of exhaust members, each of said exhaust members being coupled to opposite ends of said base conduit of the associated one of said distribution assemblies such that each of said exhaust members is in fluid communication with said base conduit of the associated one of said distribution assemblies, each of said exhaust members being adapted for directing the heated fluid from said base conduit to an area around the associated one of the wheels of the vehicle to melt the snow and ice.

7. The traction enhancing system as set forth in claim 6, further comprising:

each of said exhaust members being substantially funnel shaped such that a diameter of a first end is smaller than a diameter of a second end of the associated one of said exhaust members, said first end of each of said exhaust members being coupled to said base conduit of the associated one of said distribution assemblies such that said second end of said exhaust members is adapted for permitting the heated fluid to expand to cover a greater area to melt a greater amount of the snow and ice.

8. The traction enhancing system as set forth in claim 1, further comprising:

each of said distribution conduits comprising a heat resistant flexible material, said heat resistant flexible material being adapted for conforming to a portion of the vehicle that each of said distribution conduits is coupled to, said heat resistant flexible material being adapted for being resistant to heat from the heated fluid to inhibit the heated fluid from damaging said distribution conduits.

9. A traction enhancing system for enhancing the traction of a vehicle traveling in snowy and icy conditions, the traction enhancing system comprising:

a fluid control assembly being adapted for being coupled to the vehicle, said fluid control assembly being adapted for being in fluid communication with an internal environmental system of the vehicle such that said fluid control assembly is for selectively diverting heated fluid provided to the cabin compartment of the vehicle;

a plurality of distribution assemblies being operationally coupled to said fluid control assembly such that said distribution assemblies are in fluid communication with said fluid control assembly, each of said distribution assemblies being adapted for being coupled to the vehicle such that each of said distribution assemblies is positioned proximate one of a plurality of wheels of the vehicle such that each of said distribution assemblies is for directing the heated fluid onto the snow and ice proximate the associated one of the wheels to melt the snow and ice and improve traction between the wheels and the road when said fluid control assembly is diverting heated fluid to said distribution assemblies;

said fluid control assembly comprising a valve member, said valve member being operationally coupled to said distribution assemblies, said valve member being adapted for being coupled to a ventilation system of the vehicle such that said valve member is for diverting at least a portion of heated air from the ventilation system of the vehicle to said distribution assemblies;

said fluid control assembly comprising a control member, said control member being adapted for being coupled to a dashboard of a vehicle such that said control member is easily actuated by a driver of the vehicle, said control assembly is operationally coupled to said valve member of said fluid control assembly such that said control assembly actuates said valve member to control the amount of heated air diverted from the ventilation system of the vehicle when said control member is actuated by the user;

each of said distribution assemblies comprising a base conduit, said base conduit being operationally coupled to said valve member of said fluid control assembly such that said base conduit of each of said distribution assemblies is for directing the heated air from said fluid control assembly onto the snow and ice, said base conduit of each of said distribution assemblies being adapted for being positioned in one of the wheel wells of the vehicle proximate the associated one of the wheels of the vehicle such that said base conduit is for directing the heated air in front of and behind the associated one of the wheels;

said base conduit of each of said distribution assemblies comprising a heat resistant flexible material, said heat resistant flexible material being adapted for conforming to the associated one of the wheel wells, said heat resistant flexible material being adapted for being resistant to heat from the heated air to inhibit the heated air from damaging said base conduit;

each of said distribution assemblies comprising a plurality of exhaust members, each of said exhaust members being coupled to opposite ends of said base conduit of the associated one of said distribution assemblies such that each of said exhaust members is in fluid communication with said base conduit of the associated one of said distribution assemblies, each of said exhaust members being adapted for directing the heated air from said base conduit to an area around the associated one of the wheels of the vehicle to melt the snow and ice;

each of said exhaust members being substantially funnel shaped such that a diameter of a first end is smaller than a diameter of a second end of the associated one of said exhaust members, said first end of each of said exhaust members being coupled to said base conduit of the associated one of said distribution assemblies such that said second end of said exhaust members is adapted for permitting the heated air to expand to cover a greater area to melt a greater amount of the snow and ice;

a plurality of distribution conduits being operationally coupled between said valve member of said valve control assembly and said base conduits of each of said distribution assemblies, each of said distribution conduits being adapted for being coupled to the vehicle, each of said distribution assemblies permitting fluid communication between said valve control assembly and the associated one of said distribution assemblies such that said distribution conduits are adapted for permitting the heated air to be transferred from said valve control assembly to said distribution assemblies;

each of said distribution conduits comprising a heat resistant flexible material, said heat resistant flexible material being adapted for conforming to a portion of the vehicle that each of said distribution conduits is coupled to, said heat resistant flexible material being adapted for being resistant to heat from the heated air to inhibit the heated air from damaging said distribution conduits; and a plurality of distribution members being operationally coupled to said distribution conduits, each of said distribution members being in fluid communication with the associated one of said distribution conduits, each of said distribution members being adapted for being coupled to the vehicle such that said distribution members are positioned between the front wheels and the rear wheels of the vehicle, each of said distribution members being adapted for directing the heated air onto the snow and ice to facilitate melting of the snow and ice between the front wheels and the rear wheels of the vehicle to enhance traction of wheels.

* * * * *